(No Model.)
F. J. PATTEN.
ELECTRIC MOTOR OR DYNAMO ELECTRIC MACHINE.
No. 374,621. Patented Dec. 13, 1887.
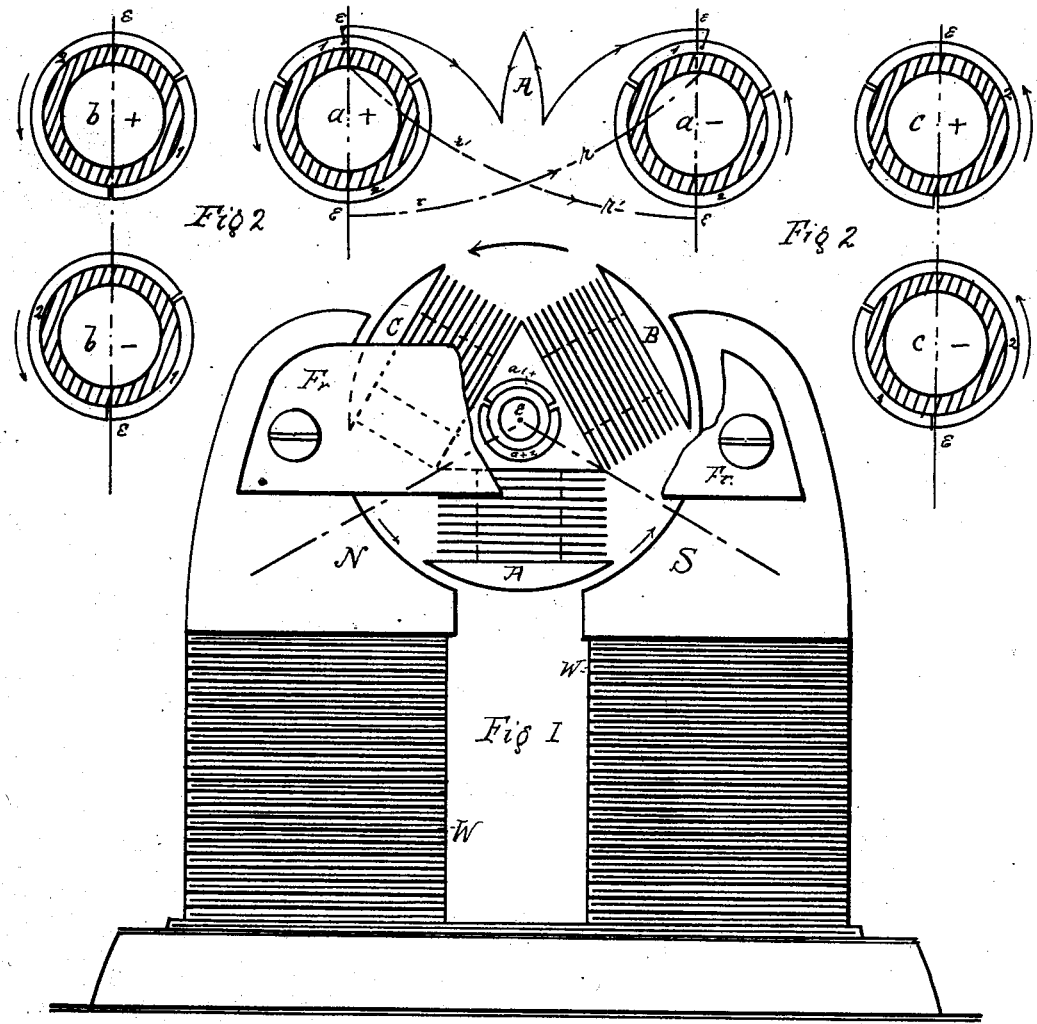
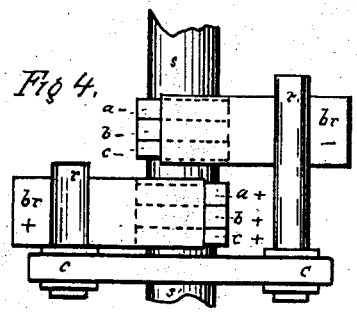
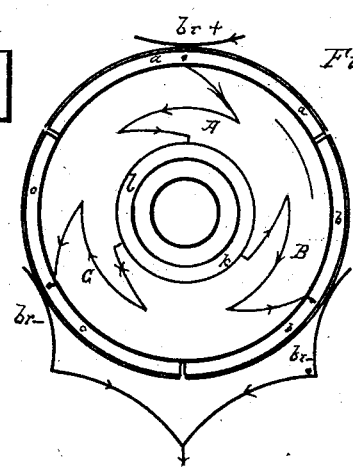
WITNESSES:
INVENTOR

United States Patent Office.

F. JARVIS PATTEN, OF FORT SIDNEY, NEBRASKA.

ELECTRIC MOTOR OR DYNAMO-ELECTRIC MACHINE.

SPECIFICATION forming part of Letters Patent No. 374,621, dated December 13, 1887.

Application filed January 18, 1887. Serial No. 224,729. (No model.)

*To all whom it may concern:*

Be it known that I, F. JARVIS PATTEN, a citizen of the United States, and a resident of Fort Sidney, county of Cheyenne, State of Nebraska, have invented a new and useful Improvement in Electric Motors or Dynamo-Electric Machines, of which the following is a specification.

My invention consists in a new arrangement of the field-magnet poles, armature-commutators, and connections in a dynamo-electric machine or motor.

Reference will be made to the accompanying drawings, in which Figure 1 is an end elevation of the machine. Fig. 2, with its six parts, indicates by diagram the method of placing the commutator-segments upon the armature-spindle, and shows how the coils are connected to those segments in order to give the desired results. This figure applies only, however, to their arrangement in parallel arc. Fig. 3 is a diagram of another commutator system and method of connecting the coils in such a way that two of the three armature-coils will be in parallel arc and the third in series with them and the external circuit. Fig. 4 shows in plan the relative arrangement of the brushes and their position with respect to the positive and negative sets of commutator-segments.

In Fig. 1, W W are the field-magnets, which may be of any suitable form. They end in the pole-pieces N and S, and attached to the latter. The frame or supports $Fr$ $Fr$ serve to carry the armature-spindle and the brushes. The field-poles N and S embrace about a quadrant each of the cylindrical surface of the armature, and are arranged symmetrically only with reference to a vertical axis.

The armature is constructed upon the three-pole shuttle-wound pattern, and consists, virtually, of three "pole" armatures, A, B, and C, Fig. 1, radiating at equal angular intervals of one hundred and twenty degrees from the spindle or axis. The armature-coils are so connected to the commutator-segments, and these segments are so arranged upon the axis, that each coil in turn has a north pole at its outer extremity during one-third of a complete revolution and a south pole during the remaining two-thirds of a revolution, the current being continuous through all the coils at all times, none being cut out of circuit.

In this machine what corresponds to the usual diameter of commutation is a broken line consisting of two radii, N$e$ and $e$S, Fig. 1, meeting in the axis of the armature, equally inclined to the vertical, and making with each other an angle of one hundred and twenty degrees, so that their outer extremities lie in the centers of the field-poles N and S. On passing these imaginary lines each armature-coil in turn is caused to change its polarity. To effect the changes in each coil in turn, as described, their extremities are connected to the parts of a double commutator, one revolving under the positive and one under the negative brush, both brushes being necessarily placed, as shown in Fig. 4, upon the same side of the axis or spindle, (preferably the upper.) The arrangements and connections are such that each coil in turn has a north pole at its outer extremity while passing from N to S in the direction indicated by the arrow in Fig. 1, and a south pole at the same outer extremity while passing through the remaining two-thirds of a complete revolution from S over to N in the same direction.

The six diagrams in Fig. 2 show the relative position upon the axis or spindle of the six half-commutators, two for each coil, and the system of connecting the coils to the commutator-segments is shown by diagram for the coil A in same figure, the other two coils, B and C, being connected to their corresponding segments in the same way. The half-commutators for the three coils A, B, and C are designated, respectively, $a+$ $a-$ for the coil A, $b+$ and $b-$ for the coil B, and $c+$ and $c-$ for the coil C.

The dotted lines E E throughout the different parts of Fig. 2 represent the same vertical diameter of the spindle, from which it results that the six diagrams indicate the proper relative positions of the different commutator-segments upon the axis or armature-spindle. Similar ends of each of the three coils are connected to the segments $a+1$, $b+1$, $c+1$, covering each a third of the spindle and succeeding each other in rotation thereon. These parts or segments belong to half-commutators $a+$ $b+$ $c+$, Fig. 4, that revolve under the positive brush $br+$, Fig. 4, or, say, that through which the current enters the coils. The other half-commutators, $a-$ $b-$ $c-$, are separate from the former, but are placed together and revolve under the negative brush $br-$, Fig. 4, or, say, that through which the current leaves the coils. The brushes are attached to a carrier or collar, $c\ c$, Fig. 4, and so placed that both brushes bear in line upon the same side of the spindle or axis. Now the corresponding segments, $a+1$ and $a-1$, are so placed that they come simultaneously under their respective brushes, $br+$ and $br-$. These segments are followed by the similar parts, $b+1$ and $b-1$, pertaining to the coil B, and these in turn by the segments $c+1$ and $c-1$, pertaining to the coil C, Fig. 2. Similar ends of each coil being connected to the segments $a+1$, $b+1$, $c+1$, it results that each coil in turn has the same polarity at its outer extremity during a third of a revolution, or, say, while passing from N to S a north pole $-$.

The continuous and relative action of the coils will be understood from an examination of the connections for the coil A shown in diagram in Fig. 2, the others being connected in the same way and following each other through the same phases in rotation. One end of the coil A is attached to the segment $a+1$, and the other end to the similar segment $a-1$, which revolves simultaneously with the former under the negative brush $br-$, Fig. 4, the former revolving under the positive brush $br+$, Fig. 4. The segment $a-1$, Fig. 2, is connected by a free conductor, $r$, to the segment $a+2$, which covers two-thirds of the circumference of this half-commutator for the coil A, that revolves under the positive brush, and the strip $a+1$ is likewise connected by a free conductor, $r'$, to a corresponding two-thirds segment, $a-2$, in the half-commutator for this coil that revolves under the negative brush. If, now, we conceive rotation to take place in the direction of the arrows and the current to flow through the coils always from $br+$ to $br-$, the operativeness of these connections can be easily followed.

The current will flow direct in the coil A, Fig. 2, from $a+1$ to $a-1$ during one-third of a complete revolution of this coil—that is, while these two commutator-segments are in bearing against their respective brushes $br+$ and $br-$, Fig. 4. During the remaining two-thirds part of a single complete revolution the larger segments, $a+2$ and $a-2$, will be simultaneously in bearing against the same brushes; but as the current flows in the same direction it will now enter through segment $a+2$, and, passing by the free conductor $r$ to the segment $a-1$, it will traverse the coil A in a reverse direction from $a-1$ to $a+1$, and thence through the free conductor $r'$ to $a-2$, where the current will leave the coil through the brush $br-$, Fig. 4, against which this segment is in bearing. Now, as the corresponding segments for each coil, $a+1$, $b+1$, $c+1$, follow each other in rotation, each being succeeded by its corresponding two-thirds segment, $a+2$, $b+2$, $c+2$, under the same brush, it follows that each coil in turn has one polarity (say the north) at its outer extremity during one-third and the reverse polarity during the remaining two-thirds of a complete revolution. Thus the current entering the armature is continually split into three parallel circuits, one being direct, inducing a north pole at the other extremity of its coil, while the other two traversing the remaining coils in a reverse direction produce south poles. As a result of this arrangement it will be observed that each armature A B C has in turn a north pole from N to S in the direction of the arrow, Fig. 1, and a south pole while passing from S over to N, and in consequence of this and the field-poles, placed as described, it is evident there can be no point in the revolution at which the coils or armature-poles are all simultaneously inactive, but tend all to produce a continuous rotary torque. To facilitate the connections, as described, the spindle is preferably made hollow.

A different system of connection for the coils is shown in Fig. 3 by diagram for all the coils. In this arrangement there is but a single commutator composed of three equiangular segments, to which the similar ends of each coil are connected, the remaining ends of all being connected together or to a common ring or free conductor, $l\ k$, Fig. 3. This system for continuous currents through all the coils at all times (a distinctive feature) requires a single positive brush $br+$, Fig. 3, placed as before, and two negative brushes $br-$, Fig. 3, connected to the negative terminal, and having bearings that are equally removed by one hundred and twenty degrees from the bearing of the positive brush and from each other. In the position shown in Fig. 3 the current entering the commutator-segment $a$ passes through the coil A direct and from the common connector $l\ k$, through the coils C and B, in parallel circuit, but in a reverse direction, and leaving these coils through the two negative brushes $br-$, the current reaches the negative terminal of the machine. It is evident that as the axis rotates the current traverses each coil in turn direct and from it in a reverse direction through the remaining two to the opposite brushes.

Having thus described my invention, what I claim, and desire to secure by Letters Patent, is the following:

1. In a dynamo-electric machine or motor, a tri-polar or three-coil armature having the terminal extremities of its coils attached to commutator-segments that extend over unequal supplementary arcs of the armature-spindle, each armature-coil provided with two sets of such commutators, one placed and revolving under each brush of the machine, the separate sets for each coil being secured to the armature-spindle with their like parts following each other in rotation thereon.

2. In a dynamo-electric machine or motor, three armature-coils connected to the alternate parts of a double commutator for each, making for each coil four terminals which are secured to the armature-spindle in pairs, the corresponding parts of such pairs being so arranged in succession thereon that as the armature-spindle revolves they are brought simultaneously under the opposite brushes of the machine.

3. In a dynamo-electric machine or motor, armature-coils connected to a double set of commutator segments or terminals attached to and revolving with the armature-spindle, each set separately placed under and in contact with one brush of the machine only, said brushes being placed in bearing upon the same side of the armature-spindle.

4. In a dynamo-electric machine or motor, a tri-polar or three-coil armature placed between terminal field-magnet pole-pieces that extend over unsymmetrical arcs of the armature circumference.

In testimony that I claim the foregoing as my invention I have signed my name in presence of two witnesses.

F. JARVIS PATTEN.

Witnesses:
F. L. PALMER,
S. ROBERT SHUMAN.